(12) United States Patent
Chen et al.

(10) Patent No.: US 10,984,787 B2
(45) Date of Patent: Apr. 20, 2021

(54) MULTIMEDIA APPARATUS AND MULTIMEDIA SYSTEM

(71) Applicant: PEGATRON CORPORATION, Taipei (TW)

(72) Inventors: Po-Chun Chen, Taipei (TW);
Tzu-Fang Huang, Taipei (TW);
Chung-Kuan Wang, Taipei (TW);
Chia-Ching Chen, Taipei (TW);
Kuang-Hsun Hsieh, Taipei (TW);
Chih-Hsien Tsung, Taipei (TW);
Hsiang-Lin Yang, Taipei (TW);
Tao-Hua Cheng, Taipei (TW);
Cheng-Yu Kao, Taipei (TW);
Nien-Chih Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 176 days.

(21) Appl. No.: 15/927,939

(22) Filed: Mar. 21, 2018

(65) Prior Publication Data

US 2018/0342246 A1 Nov. 29, 2018

(30) Foreign Application Priority Data

May 26, 2017 (TW) .................................. 106117516

(51) Int. Cl.
*G10L 17/22* (2013.01)
*G10L 15/22* (2006.01)
(Continued)

(52) U.S. Cl.
CPC .............. *G10L 15/22* (2013.01); *G06F 3/167* (2013.01); *G06F 16/632* (2019.01);
(Continued)

(58) Field of Classification Search
CPC ...... G06F 3/167; G06F 9/30145; G06F 16/48; G06F 16/951; G06F 16/9032; G06F 3/16;
(Continued)

(56) References Cited

U.S. PATENT DOCUMENTS 5,880,710 A * 3/1999 Jaberi .................... B60K 35/00
345/618
9,020,825 B1 * 4/2015 Garber .................. G06F 3/0485
704/275
(Continued)

FOREIGN PATENT DOCUMENTS

CN 204903990 12/2015
TW 201607305 2/2016
(Continued)

OTHER PUBLICATIONS

"Office Action of Taiwan Counterpart Application," dated Oct. 23, 2017, p. 1-p. 11, in which the listed references were cited.

*Primary Examiner* — Huyen X Vo
(74) *Attorney, Agent, or Firm* — J.C. Patents

(57) ABSTRACT

A multimedia apparatus includes a wireless transmission device, an audio receiving device, a processing device and a projection device. The audio receiving device is for receiving a first voice data. The processing device is coupled with the audio receiving device and the wireless transmission device. The processing device is for outputting the first voice data via the wireless transmission device. The projection device is coupled with the processing device. When the processing device receives a first image data corresponding to the first voice data via the wireless transmission device, the processing device operates the projection device to project a first projection picture according to the first image data. A multimedia system including the multimedia apparatus is also disclosed.

22 Claims, 7 Drawing Sheets

(51) Int. Cl.
*G06F 16/632* (2019.01)
*G06F 16/78* (2019.01)
*G06F 16/9032* (2019.01)
*G06F 3/16* (2006.01)

(52) U.S. Cl.
CPC ...... *G06F 16/7867* (2019.01); *G06F 16/9032* (2019.01); *G10L 17/22* (2013.01); *G10L 2015/223* (2013.01)

(58) Field of Classification Search
CPC .... G06F 16/632; G06F 16/7867; G06F 16/78; G10L 15/22; G10L 15/26; G10L 2015/223; G10L 15/08; G10L 15/30; G10L 15/1822; G10L 15/18; G10L 13/027; G10L 15/00; G10L 15/1815; G10L 2015/088; G10L 15/04; G10L 15/063; G10L 15/16; G10L 15/187; G10L 15/20; G10L 15/25; G10L 2015/025; G10L 25/39; G10L 25/75; G10L 25/87; G10L 2021/065; G10L 21/10; G10L 17/22; G10L 2015/228; G10L 21/06

See application file for complete search history.

(56) References Cited

U.S. PATENT DOCUMENTS

| | | |
|---|---|---|
| 9,060,224 B1 | 6/2015 | List |
| 9,390,724 B2 | 7/2016 | List |
| 2006/0178777 A1 | 8/2006 | Park et al. |
| 2009/0132926 A1* | 5/2009 | Bucha ................. G06F 3/16 715/730 |
| 2013/0060571 A1* | 3/2013 | Soemo ............... G10L 15/30 704/251 |
| 2013/0332168 A1 | 12/2013 | Kim et al. |
| 2014/0236594 A1* | 8/2014 | Clarke ................ G10L 15/26 704/233 |
| 2015/0288938 A1* | 10/2015 | Wetzler ............. H04N 9/3173 348/337 |
| 2015/0293740 A1* | 10/2015 | Cho .................. H04N 21/4122 345/1.2 |
| 2015/0382047 A1* | 12/2015 | Van Os ................ G09C 1/00 725/38 |
| 2016/0098998 A1* | 4/2016 | Wang ............. G06F 16/90332 704/246 |
| 2017/0046965 A1* | 2/2017 | Kamhi ................ G09B 5/067 |
| 2018/0152694 A1* | 5/2018 | Oonishi ............. H04N 13/398 |
| 2018/0322870 A1* | 11/2018 | Lee .................... G10L 15/22 |

FOREIGN PATENT DOCUMENTS

| | | |
|---|---|---|
| TW | 201716929 | 5/2017 |
| WO | 2015108341 | 7/2015 |

* cited by examiner

MULTIMEDIA APPARATUS AND MULTIMEDIA SYSTEM

RELATED APPLICATIONS

This application claims priority to Taiwan Application Serial Number 106117516, filed May 26, 2017, which is herein incorporated by reference.

BACKGROUND

Field of Invention

The invention relates to a media apparatus and, in particular, to a multimedia apparatus including a projection device and a multimedia system.

Related Art

Along with the development of technology, various multimedia electronic products, such as smartphones or smartwatches, have been designed or developed. Due to the evolution of technology, modern multimedia apparatuses tend to be developed toward the direction of providing multiple functions. Particularly, more and more multimedia apparatuses provide users with voice control via voice recognition functionalities. However, the simple multimedia operations provided by traditional multimedia apparatuses cannot satisfy the needs of the user or new multimedia applications. Therefore, how to design a multimedia apparatus to provide convenient and diversified multimedia operations and good user experiences is an important issue.

SUMMARY

The invention provides a multimedia apparatus and a multimedia system that can receive the voice data provided by a user, and can project corresponding image data based on the recognition result of the voice data provided by the user.

The multimedia apparatus of the invention includes a wireless transmission device, an audio receiving device, a processing device and a projection device. The audio receiving device is for receiving a first voice data. The processing device is coupled with the audio receiving device and the wireless transmission device. The processing device is for outputting the first voice data via the wireless transmission device. The projection device is coupled with the processing device. When the processing device receives a first image data corresponding to the first voice data via the wireless transmission device, the processing device operates the projection device to project a first projection picture according to the first image data The multimedia system of the invention includes a cloud system and a multimedia apparatus. The cloud system has a voice recognition device and an external server. The multimedia apparatus includes a wireless transmission device, an audio receiving device, a processing device and a projection device. The wireless transmission device is coupled with the cloud system. The audio receiving device is for receiving a first voice data. The processing device is coupled with the audio receiving device and the wireless transmission device. The processing device is for outputting the first voice data via the wireless transmission device to the cloud system. The voice recognition device is suitable for recognizing the first voice data to obtain a recognition result, and the external server outputs a first image data according to the recognition result to the processing device. The projection device is coupled with the processing device. When the processing device receives the first image data corresponding to the first voice data via the wireless transmission device, the processing device operates the projection device to project a first projection picture according to the first image data.

Based on the above, the multimedia system including the cloud system and the multimedia apparatus can provide interactive and diversified multimedia operation functions and good user experiences based on the voice data of the user.

The invention will become more fully understood from the detailed description and accompanying drawings, which are given for illustration only, and thus are not limitative of the present invention.

DETAILED DESCRIPTION OF THE EMBODIMENT

The present invention will be apparent from the following detailed description, which proceeds with reference to the accompanying drawings, wherein the same references relate to the same elements.

Figure 1:
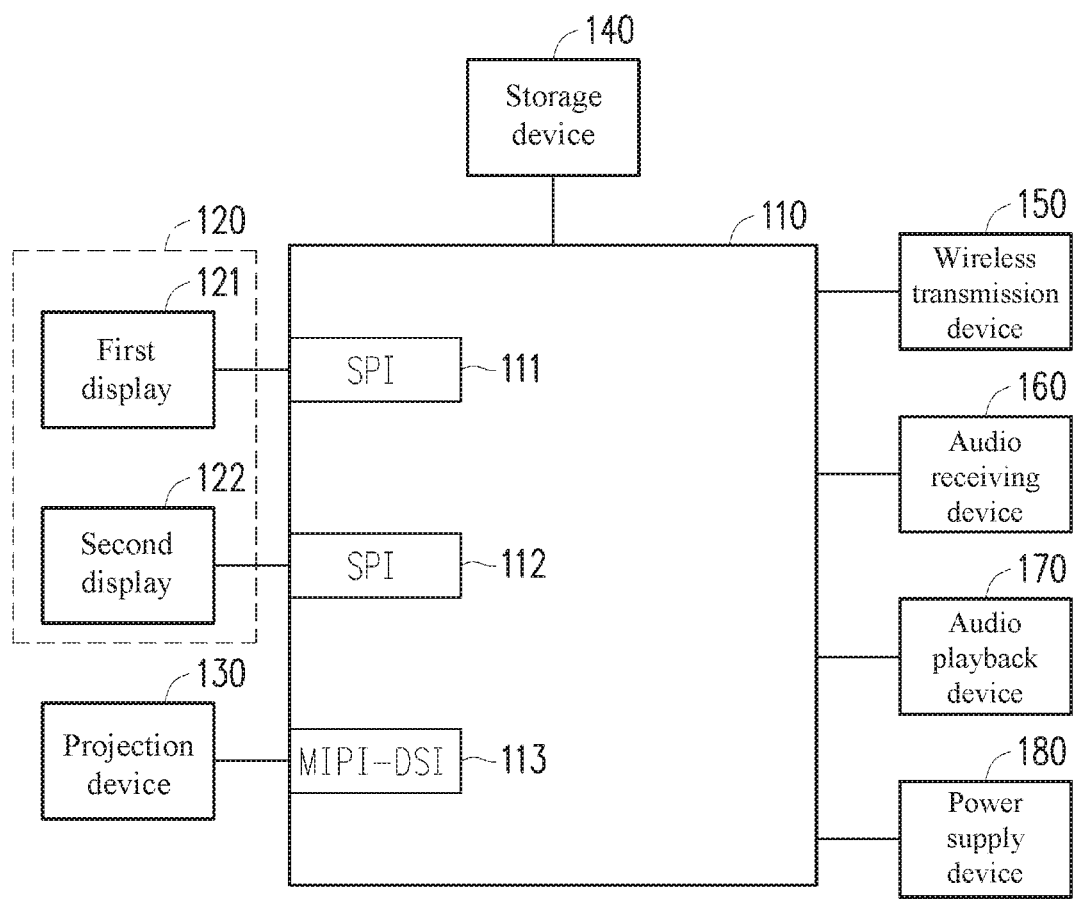
FIG. 1 is a schematic diagram showing the multimedia apparatus according to an embodiment of the invention.

FIG. 1 is a schematic diagram showing the multimedia apparatus according to an embodiment of the invention. Referring to FIG. 1, the multimedia apparatus 100 includes a processing device 110, a display module 120, a projection device 130, a storage device 140, a wireless transmission device 150, an audio receiving device 160, an audio playback device 170 and a power supply device 180. In the present embodiment, the processing device 110 is coupled with the display module 120, the projection device 130, the storage device 140, the wireless transmission device 150, the audio receiving device 160, the audio playback device 170 and the power supply device 180. In the present embodiment, the processing device 110 includes connection ports 111 and 112 that complies with the SPI (Serial Peripheral Interface) and a connection port 113 that complies with the MIPI-DSI (Mobile Industry Processor Interface-Display Serial Interface) protocol. In the present embodiment, the processing device 110 is coupled with the projection device 130 via the connection port 113.

In the present embodiment, the processing device 110 is a SoC (System on Chip). However, the invention is not limited therein. In other embodiment, the processing device 110 may also be a CPU (Central Processing Unit), a programmable general-purpose microprocessor, a DSP (digital signal processor), a programmable controller, an ASIC (Application-Specific Integrated Circuit), a PLD (Programmable Logic Device), other similar processing device or a combination of these devices.

In the present embodiment, the display module 120 includes a first display 121 and a second display 122. The processing device 110 is coupled with the first display 121 and the second display 122 of the display module 120 via the connection ports 111 and 112, respectively. The first display 121 and the second display 122 may be, for example, PMOLED (Passive Matrix Organic Light Emitting Diode) displays, but the invention is limited therein. In one embodiment, the display module 120 may include one or more displays and is not limited by FIG. 1. Moreover, the displays of the display module 120 may be, for example, EPDs (electronic paper display), LCDs (liquid crystal display), LEDs (light-emitting diode), FEDs (field emission display) or other type of displays.

In the present embodiment, the first display 121 and the second display 122 are connected to ports 111 and 112 to receive the two sub-image signals provided by the processing device 110, respectively, and display two sub-image pictures according to these two sub-image signals, respectively. In the present embodiment, the two sub-image pictures shown by the first display 121 and the second display 122 are suitable for being combined into an emoticon graphic. For example, the first display 121 and the second display 122 may display a left-eye graphic and a right-eye graphic, respectively. The processing device 110 can control the first display 121 displaying the sub-image picture representing the left-eye graphic and the second display 122 displaying the sub-image picture representing the right-eye graphic.

In the present embodiment, the storage device 140 may be, for example, a DRAM (dynamic random access memory), a flash memory or an NVRAM (non-volatile random access memory). In the present embodiment, the storage device 140 stores the data and module described in the embodiments of the invention which are accessible and/or executable by the processing device 110 so that the multimedia apparatus 100 can realize the multimedia application operations described in the embodiments of the invention.

In the present embodiment, the wireless transmission device 150 may be, for example, a device compatible with Wi-Fi (wireless fidelity), WiMAX (worldwide interoperability for microwave access), Bluetooth, UWB (ultra-wideband) or RFID (radio-frequency identification) communication protocol. The wireless transmission device 150 establishes a wireless connection with another electronic device or cloud system having a wireless transmission device via wireless transmissions, and can transmit the voice data, image data and event-processing signals according to the embodiments of the invention.

In the present embodiment, the power supply device 180 is for providing voltage power to the processing device 110 to enable the processing device 110 to perform the multimedia operations according to the embodiments of the invention. Moreover, the power supply device 180 of the present embodiment may include a DC to DC converter to convert the voltage level provided by an external power source or an internal battery, but the invention is not limited therein.

Figure 2:
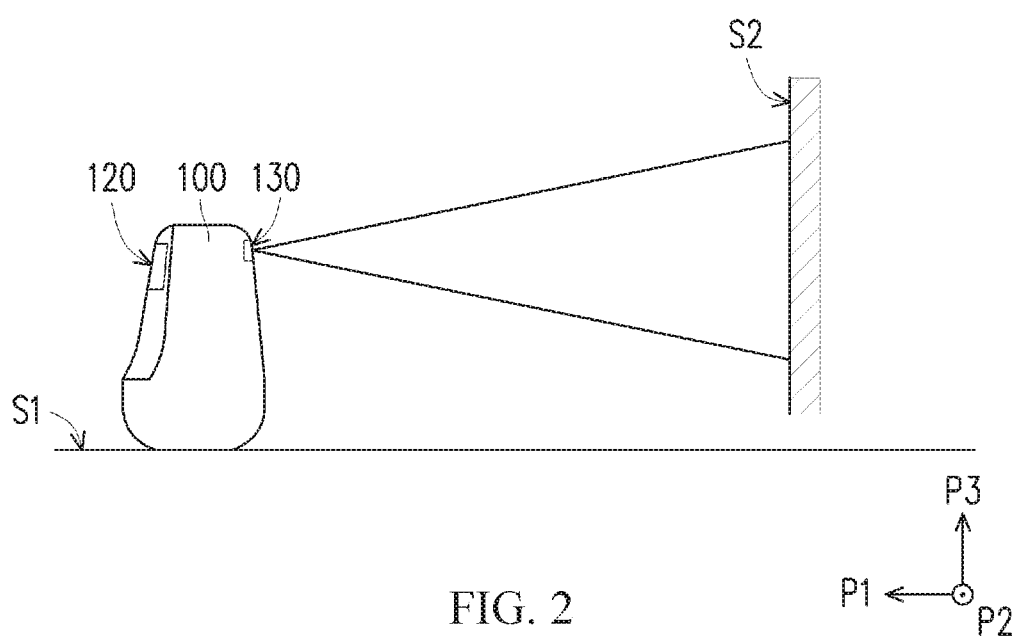
FIG. 2 is a side view of the multimedia apparatus shown in FIG. 1.

FIG. 2 is a side view of the multimedia apparatus shown in FIG. 1. Referring to FIG. 1 and FIG. 2, the multimedia apparatus 100 may be, for example, a smart speaker or a voice control speaker. One side of the multimedia apparatus 100 may have the display module 120, and another side may have the projection device 130. In the present embodiment, the multimedia apparatus 100 is disposed in the space formed by coordinate axes P1, P2 and P3, wherein the coordinate axes P1, P2 and P3 are perpendicular to each other. The coordinate axes P1 and P2 may be, for example, horizontal axes, and the coordinate axis P3 may be, for example, a vertical axis. In the present embodiment, the multimedia apparatus 100 may be disposed on the surface S1 formed by the coordinate axes P1 and P2, and the image picture can be projected by the multimedia apparatus 100 onto the surface S2 formed by coordinate axes P2 and P3.

In the present embodiment, the surface S1 may be a table surface, and the surface S2 may be a wall surface. That is, a user can put the multimedia apparatus 100 on any table surface and interact with the multimedia apparatus 100 by voice. The user can see the emoticon graphic shown by the display module 120 at one side of the multimedia apparatus 100, and see the image picture projected onto the surface S2 by the projection device 130 at another side of the multimedia apparatus 100. However, the disposition, the projection direction and the appearance of the multimedia apparatus 100 is not limited by those shown in FIG. 2. The embodiment shown in FIG. 2 is just an exemplary example of one possible implementation of the invention.

In the present embodiment, the audio receiving device is for receiving a first voice data. The processing device outputs the first voice data via the wireless transmission device. When the processing device receives the first image data corresponding to the first voice data via the wireless transmission device, the processing device operates the projection device to project the first projection picture according to the first image data. Several embodiments will be described hereinbelow as enabling examples of the invention.

Figure 3:
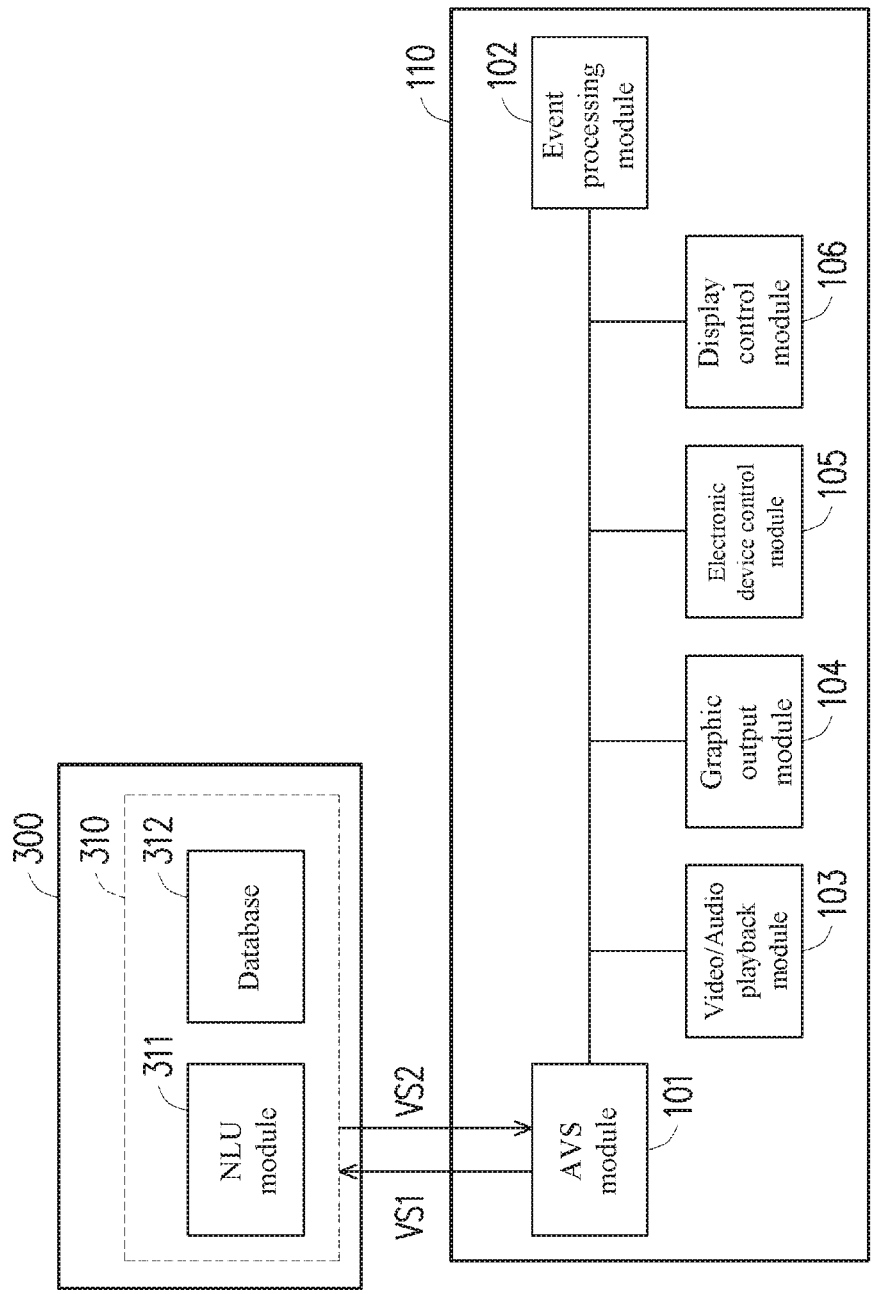
FIG. 3 is a schematic diagram showing the multimedia system according to an embodiment of the invention.

FIG. 3 is a schematic diagram showing the multimedia system according to an embodiment of the invention. Referring to FIG. 1 and FIG. 3, the multimedia system 30 may include the multimedia apparatus 100 and a cloud system 300. The cloud system 300 may be implemented in external physical servers and establish connections with the multimedia apparatus 100 via wireless transmissions. In the present embodiment, the cloud system 300 includes a voice recognition device 310. The voice recognition device 310 includes an NLU (natural language understanding) system 311 and a database 312. In one embodiment, the voice recognition device 310 may be, for example, a skill kit utilizing Alexa Voice Service developed by Amazon, or a skill kit developed based on Amazon's Alexa Voice Service. The invention is not limited therein.

In the present embodiment, the processing device 110 of the multimedia apparatus 100 may further include an AVS (Audio Video coding Standard) module 101, an event handler 102, a video/audio playback module 103, a graphic output module 104, an electronic device control module 105 and a display control module 106. The processing device 110 can execute these modules to implement the multimedia operations according to the embodiments of the invention. Specifically, in the present embodiment, when the multimedia apparatus 100 receives relevant image data or event handling signals from the outside via the wireless transmission device 150, the event processing module 102 can drive at least one of the video/audio playback module 103, the graphic output module 104, the electronic device control module 105 and the display control module 106 to perform relevant multimedia operations.

It is noteworthy that the modules described in the embodiments of the invention can be implemented by way of software or hardware circuits. For example. These modules can be stored in the storage device 140 for the access and execution of the processing device 110. Alternatively, these modules can be implemented in the processing device 110 in the form of hardware circuits and/or chip modules, respectively.

In the present embodiment, the multimedia apparatus 100 receives the first voice data provided by the user via the audio receiving device 160, encodes the first voice data VS1 via the AVS module 101 executed by the processing device 110, and outputs via the wireless transmission device 150. In the present embodiment, the processing device 110 of the multimedia apparatus 100 outputs the first voice data VS1 via the wireless transmission device 150 to the voice recognition device 310 of the cloud system 300. The voice recognition device 310 can recognize the first voice data VS1 via the NLU module 311, and obtain a second voice data VS2 corresponding to the recognition result of the first voice data by searching the database 312. In the present embodiment, the cloud system 300 sends the second voice data VS2 to the multimedia apparatus 100 via wireless transmission. Therefore, when the processing device 110 receives the second voice data VS2 responding to the recognition result of the first voice data VS1 via the wireless transmission device 150, the processing device 110 executes the AVS module 101 to operate the audio playback device 170 to play the second voice data VS2.

That is, the multimedia system 30 has voice recognition functionality. The multimedia apparatus 100 can receive the first voice data VS1 provided by the user via the audio receiving device 160, transmits to the voice recognition device 310 of the cloud system 300 via wireless transmission, and performs the voice recognition function to the first voice data VS1 to obtain the second voice data VS2 corresponding to the recognition result of the first voice data VS1. Moreover, the multimedia apparatus 100 of the present embodiment can playback the second voice data VS2 sent from the voice recognition device 310 via the audio playback device 170. Therefore, the multimedia system 30 of the present embodiment can provide multimedia operation functionalities such as voice interactions, so that the user can provide voice messages to the multimedia apparatus 100 can receive corresponding voice feedbacks. Moreover, in the present embodiment, the processing device 130 of the multimedia apparatus 100 can drive the display module 120 via the image signal provided by the display control module 106 to display the image picture, wherein the image signal is determined in response to the second voice data.

Figure 4:
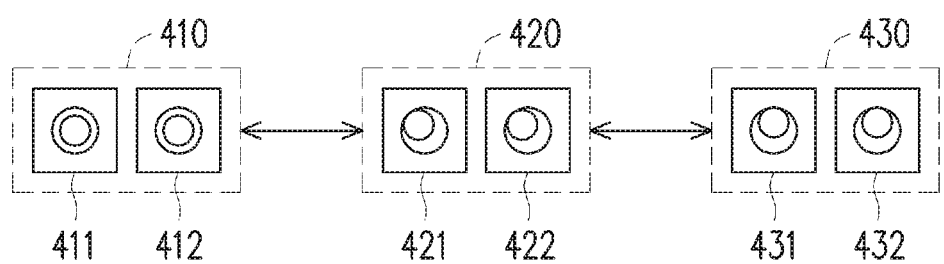
FIG. 4 is a schematic diagram showing the emoticon graphics according to one embodiment of the invention.

In detail, FIG. 4 is a schematic diagram showing the emoticon graphics according to one embodiment of the invention. Referring to FIG. 1, FIG. 3 and FIG. 4, in the present embodiment, the multimedia apparatus 100 generates the first sub-image signal and the second sub-image signal via the display control module 16 in response to the second voice data VS2, and outputs the first sub-image signal and the second sub-image signal to the first display 121 and the second display 122 respectively, wherein the first display 121 displays the first sub-image picture according to the first sub-image signal, and the second display 122 displays the second sub-image picture according to the second sun-image signal. As shown in FIG. 4, the sub-image pictures 411 and 412 are combined to be an emoticon graphic 410. The sub-image pictures 421 and 422 are combined to be another emoticon graphic 420. The sub-image pictures 431 and 432 are combined to be still another emoticon graphic 430. The multimedia apparatus 100 can include image data of these emoticon graphics 410, 420 and 430 shown in FIG. 4 by default. The two sub-image pictures displayed by the first display 121 and the second display 122 are suitable to be combined into one of the exemplary emoticon graphics 410, 420 and 430. That is, the processing device 110 can operate the first display 121 and the second display 122 to display one of the emoticon graphics 410, 420 and 430 according to the recognition result (the second voice data VS2) of the first voice data VS1.

For example, in one embodiment, the emoticon graphic 410 may be suitable to represent that the multimedia apparatus 100 is in a normal state or a standby state. The emoticon graphic 420 may be suitable for the situation where the voice recognition device 310 failed to recognize the first voice data VS1. The emoticon graphic 430 may be suitable for the situation where the multimedia apparatus 100 is in a sleep state. That is, the user can know the operation state of the multimedia system 30 based on the emoticon graphic shown by the display module 120. However, the emoticon graphic of the invention is not limited by those shown in FIG. 4. In one embodiment, the emoticon graphics composed of the first sub-image pictures and the second sub-image pictures of the display module 120 can be selectively set by the user settings or the product requirements.

Figure 5:
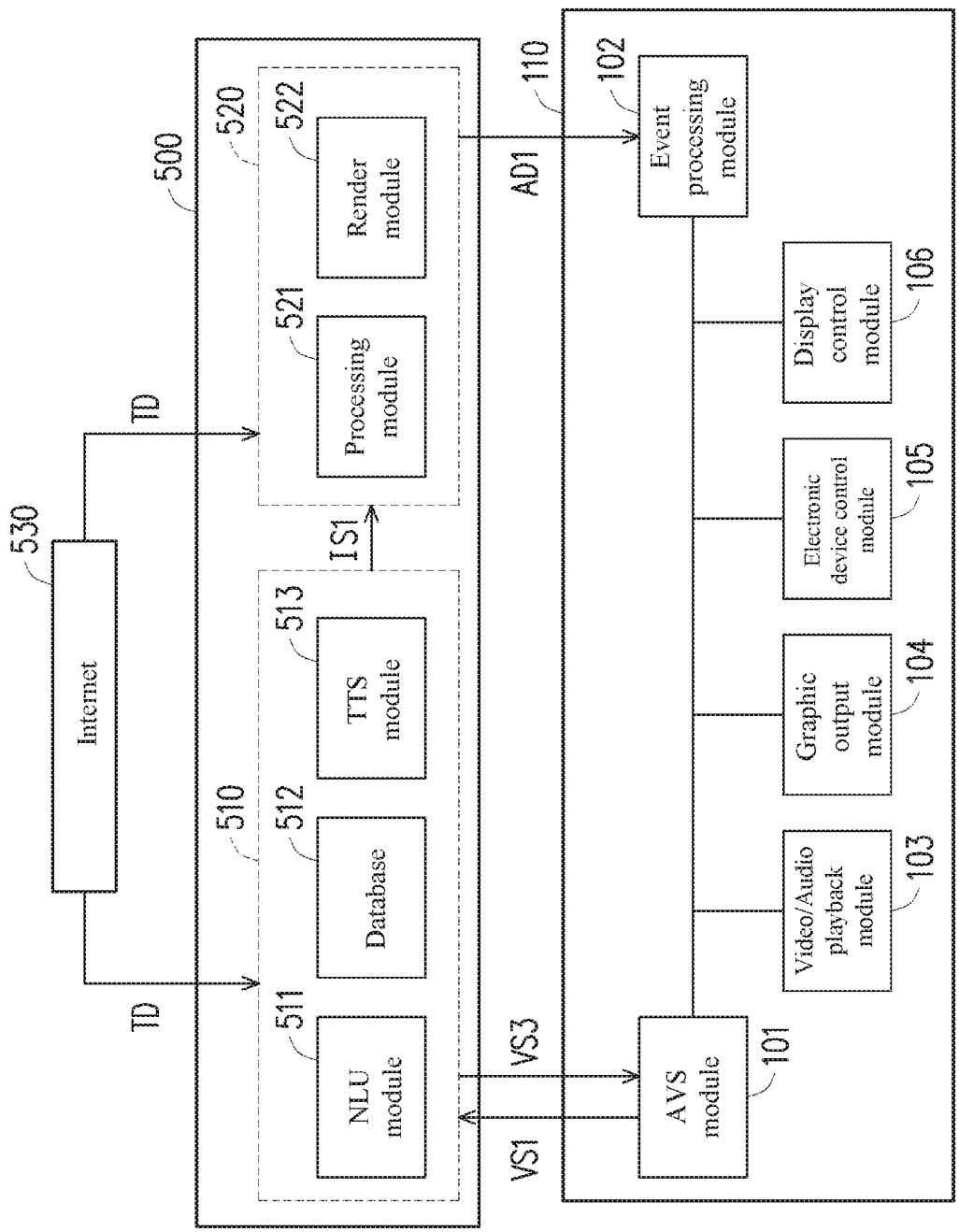
FIG. 5 is a schematic diagram showing the multimedia system according to another embodiment of the invention.

FIG. 5 is a schematic diagram showing the multimedia system according to another embodiment of the invention. Referring to FIG. 1 and FIG. 5, the multimedia system 50 may include the multimedia apparatus 100 and a cloud system 500. Compared to the embodiment shown in FIG. 3, in the present embodiment, the cloud system 500 may include a voice recognition device 510 and an external server 520. In the present embodiment, the voice recognition device 510 may include an NLU module 511, a database 512 and a TTS (Text-To-Speech) module 513. The external server 520 may include a processing module 521 and a render module 522.

In the present embodiment, the multimedia apparatus 100 receives the first voice data provided by the user via the audio receiving device 160, executes the AVS module 101 to process the first voice data VS1, and outputs via the wireless transmission device 150. The processing device 110 of the multimedia apparatus 100 outputs the first voice data VS1 via the wireless transmission device 150 and transmits to the voice recognition device 510 of the cloud system 500. The voice recognition device 510 recognizes the first voice data VS1 using the NLU module 511 and the database 512 and obtains the recognition result corresponding to the first voice data VS1. In the present embodiment, if the recognition result of the first voice data VS1 provided by the user is, for example, a request of retrieving news information and the voice recognition device 510 recognizes successfully, the voice recognition device 510 can further outputs the first instruction signal IS1 to the processing module 521 of the external server 520 according to the recognition result of the first voice data VS1, so that the external server 520 can retrieve the target data TD related to the news information from the Internet. In the present embodiment, the render server 522 of the external server 520 arranges the target data TD in a default data arrangement format to generate the first image data AD1 and output to the processing device 110. That is, the render module 522 of the present embodiment can re-arrange the data format of the target data TD to make the target data TD have a presentation format different from that of the original data retrieved from the Internet.

In the present embodiment, the target data TD may be, for example, Internet search results such as specific news webpage information, weather information, or un-specific webpage information. The invention is not limited therein. The event processing module 102 of the processing device 110 of the multimedia apparatus 100 can receive the first image data AD1 of the external server 520 via the wireless transmission device 150, and can drive at least one of the video/audio playback module 103 or the graphic output module 104 to execute related multimedia operations.

By driving at least one of the video/audio playback module 103 or the graphic output module 104 by the event processing module 102 of the processing device 110, and by operating the projection device 130 to project the first projection picture according to the first image data AD1, the first projection picture corresponds to the first image data AD1. That is, in the present embodiment, the user can send a voice data request to the multimedia apparatus 100. The multimedia apparatus 100 can retrieve the target data TD of related news information corresponding to the voice data via the cloud system 500 and provide the target data TD to the user in the form of an image picture.

Moreover, it is noteworthy that the image data described in the embodiments may further include voice data, and the processing device 110 can drive the video/audio playback module 103 to operate the audio playback device 170 to playback the audio corresponding to the received voice data according to the received voice data to accompany to projection picture projected by the projection device 130.

More specifically, in the present embodiment, the voice recognition device 510 can retrieve the target data TD from the Internet and transform the target data TD into a third voice data VS3 by the TTS module 513 to output to the multimedia apparatus 100. Subsequently, the multimedia apparatus 100 receives the third voice data VS3 via the wireless transmission device 150, so that the processing device 110 executes the AVS module 101 to process the third voice data VS3 to operate the audio playback device 170 to playback the third voice data VS3. That is, in the present embodiment, the user can send a voice data request to the multimedia apparatus 100, and the multimedia apparatus 100 can retrieve the target data TD of news information corresponding to the voice data from the cloud system 500 and provide the target data TD to the user in the form of a voice feedback.

Furthermore, the details of the devices and the modules of the multimedia apparatus and the external server of the present embodiment can be found according to the teachings and explanations described in the previous embodiments shown in FIG. 1 and FIG. 3, which are omitted here for concise purpose.

Figure 6:
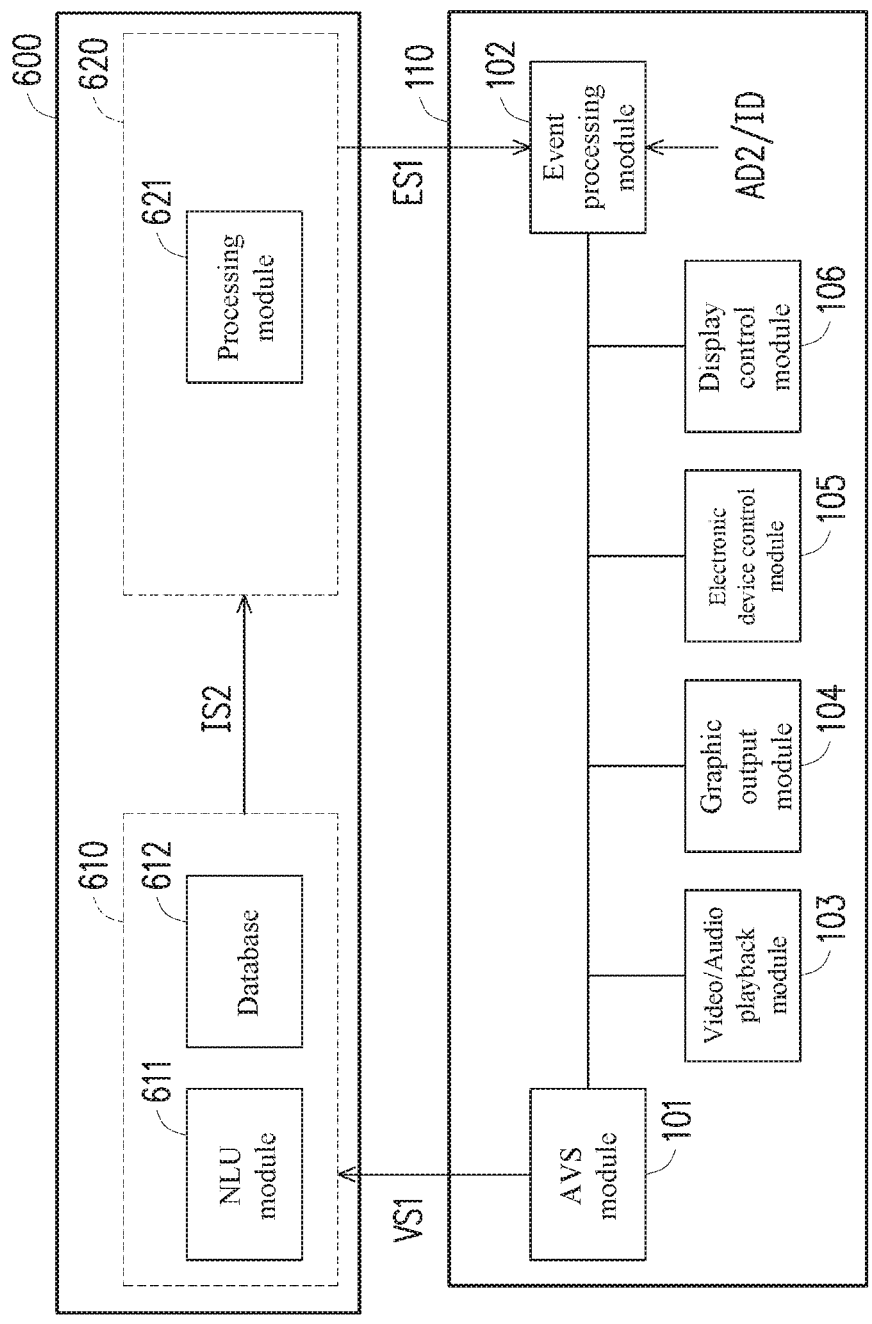
FIG. 6 is a schematic diagram showing the multimedia system according to another embodiment of the invention.

FIG. 6 is a schematic diagram showing the multimedia system according to another embodiment of the invention. Referring to FIG. 1 and FIG. 6, in the present embodiment, the multimedia system 60 may include the multimedia apparatus 100 and a cloud system 600, wherein the cloud system 600 may include a voice recognition device 610 and an external server 620. In the present embodiment, the voice recognition device 610 may include an NLU module 611 and a database 612. The external server 620 may include a processing module 621.

In the present embodiment, the multimedia apparatus 100 receives the first voice data provided by the user via the audio receiving device 160 and executes the AVS module 101 by the processing device 110 to process the first voice data VS1 and outputs via the wireless transmission device 150. The processing device 110 of the multimedia apparatus 100 outputs the first voice data VS1 via the wireless transmission device 150 to the voice recognition device 610 of the cloud system 600, so that the voice recognition device 610 recognizes the first voice data VS1 by the NLU module 611 and the database 612 and obtains the recognition result corresponding to the first voice data VS1. In the present embodiment, if the recognition result corresponding to the first voice data VS1 provided by the user is a request of showing a second image data AD2 or the graphic data ID stored in the storage device 140 of the multimedia apparatus 100 in advance, that is, the recognition result of the first voice data VS1 is related to the second image data AD2 and the voice recognition device 610 recognizes it successfully, the voice recognition device 610 may further output a second instruction signal IS2 to the processing module 621 according to the recognition result of the first voice data VS1. The event processing module 102 of the processing device 110 of the multimedia apparatus 100 receives a first event-processing signal ES1 output by the processing module 621 corresponding to the second instruction signal IS2 via the wireless transmission device 150.

In the present embodiment, the event processing module 102 of the processing device 110 may read the second image data AD2 or the graphic data ID pre-stored in the storage device 140 based on the first event-processing signal ES1, and provide the second image data AD2 or the graphic data ID to the video/audio playback module 103 or the graphic output module. Therefore, the video/audio playback module 103 or the graphic output module 104 of the processing device 110 may operate projection device 130 to project the second projection picture based on the second image data AD2 or the graphic data ID. In the present embodiment, the second image data AD2 may be, for example, image data in the MPEG-4 format having a resolution of 480p, and the graphic data ID may be, for example graphic data of the BMP or JPG format having a resolution of 1280×720. That is, the multimedia system 60 of the present embodiment can provide multimedia operating functions by voice control. The user can make a voice data request related to play the image data or the graphic data pre-stored on the storage device 140, and send the request to the multimedia apparatus 100. The multimedia apparatus 100 recognizes the voice message of the user via the cloud system 600, and plays the second image data VD2 or the graphic data ID pre-stored in the storage device 140 based on the recognition result corresponding to the voice data.

The details of the devices and the modules of the multimedia apparatus and the external server of the present embodiment can be found according to the teachings and explanations described in the previous embodiments shown in FIG. 1 and FIG. 3, which are omitted here for concise purpose.

Figure 7:
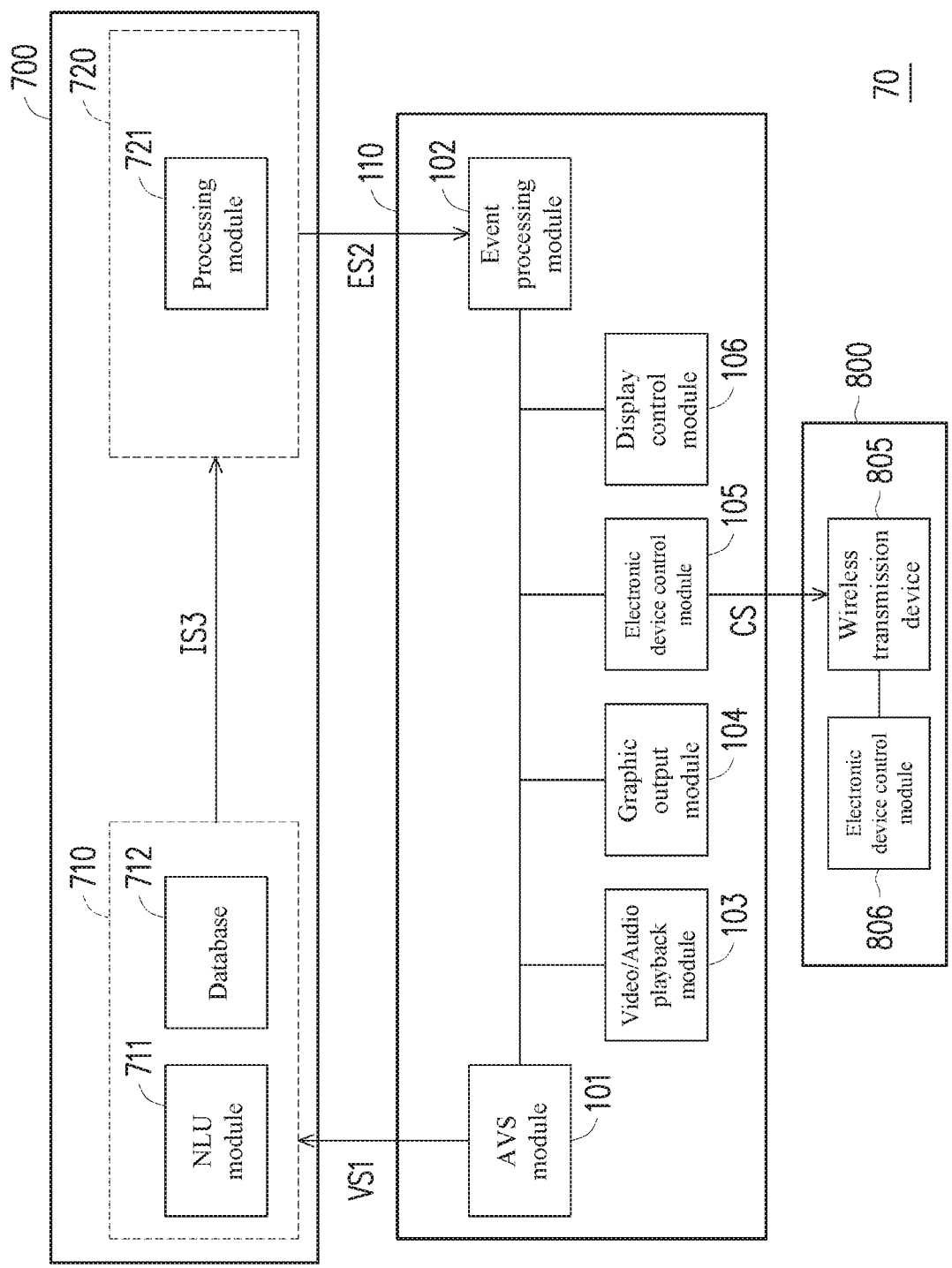
FIG. 7 is a schematic diagram showing a multimedia system according to another embodiment of the invention.

FIG. 7 is a schematic diagram showing a multimedia system according to another embodiment of the invention. Referring to FIG. 1 and FIG. 7, a multimedia system 70 may include the multimedia apparatus 100 and a cloud system 700. In the present embodiment, the cloud system 700 may include a voice recognition device 710 and an external server 720. The voice recognition device 710 may include an NLU module 711 and a database 712. In the present embodiment, the external server 720 may include a processing module 721. The processing device 110 of the multimedia apparatus 100 is coupled with an external electronic device 800 by wireless transmissions via the wireless transmission device 150, and controls the external electronic device 800 by outputting a control signal CS via driving the electronic device control module 105 of the processing device 110 according to the recognition result of the first voice data VS1.

In the present embodiment, the electronic device 800 may be, for example, a lighting device, and the electronic device 800 may include a wireless transmission device 805 and an electronic device control module 806. The electronic device 800 can establish a connection with the wireless transmission device 150 of the multimedia apparatus 100 via the wireless transmission device 805. Moreover, the electronic device control module 806 of the electronic device 800 can receive the control signal CS provided by the electronic device control module 105 of the processing device 110 via the wireless transmission device 805.

In the present embodiment, the multimedia apparatus 100 receives the first voice data VS1 provided by the user by the audio receiving device 160, and executes the AVS module 101 by the processing device 110 to process the first voice data VS1 and outputs via the wireless transmission device 150. The processing device 110 of the multimedia apparatus 100 outputs the first voice data VS1 via the wireless transmission device 150 to the voice recognition device 710 of the cloud system 700, so that the voice recognition device 710 recognizes the first voice data VS1 by the NLU module 711 and the database 712 and obtains the recognition result corresponding to the first voice data VS1. In the present embodiment, if the recognition result corresponding to the first voice data VS1 provided by the user is a request of adjusting the brightness of the lighting device, and the voice recognition device 710 recognizes it successfully, the voice recognition device 710 may further output a third instruction signal IS3 to the processing module 721 of the external server 720 according to the recognition result of the first voice data VS1. The event processing module 102 of the processing device 110 of the multimedia apparatus 100 receives a second event-processing signal ES2 output by the processing module 721 corresponding to the third instruction signal IS3 via the wireless transmission device 150.

In the present embodiment, the event processing module 102 may drive the electronic device control module 105 based on the second event-processing signal ES2, so that the electronic device control module 105 generates the control signal CS corresponding to the second event-processing signal ES2. Moreover, the processing device 110 outputs the control signal CS via the wireless transmission device 150 to the wireless transmission device 805 of the electronic device 800, so that the electronic device control module 806 of the electronic device 800 can adjust the brightness of lighting device according to the control signal CS. That is, in the present embodiment, the user can make a voice data request of adjusting the brightness of the lighting device and transmit to the multimedia apparatus 100. The multimedia apparatus 100 recognizers the voice data via the cloud system 700 and obtains the recognition result. Therefore, the multimedia apparatus 100 can adjust the brightness of the lighting device based on the recognition result of this voice message.

However, the electronic device 800 of the invention is not limited to a lighting device. In one embodiment, the electronic device 800 may also be another electronic device supporting IoT (Internet of Things) technologies, and may allow a user to control other electronic devices via the multimedia system 70 by voice. Furthermore, the details of the devices and the modules of the multimedia apparatus and the external server of the present embodiment can be found according to the teachings and explanations described in the previous embodiments shown in FIG. 1 and FIG. 3, which are omitted here for concise purpose.

Figure 8:
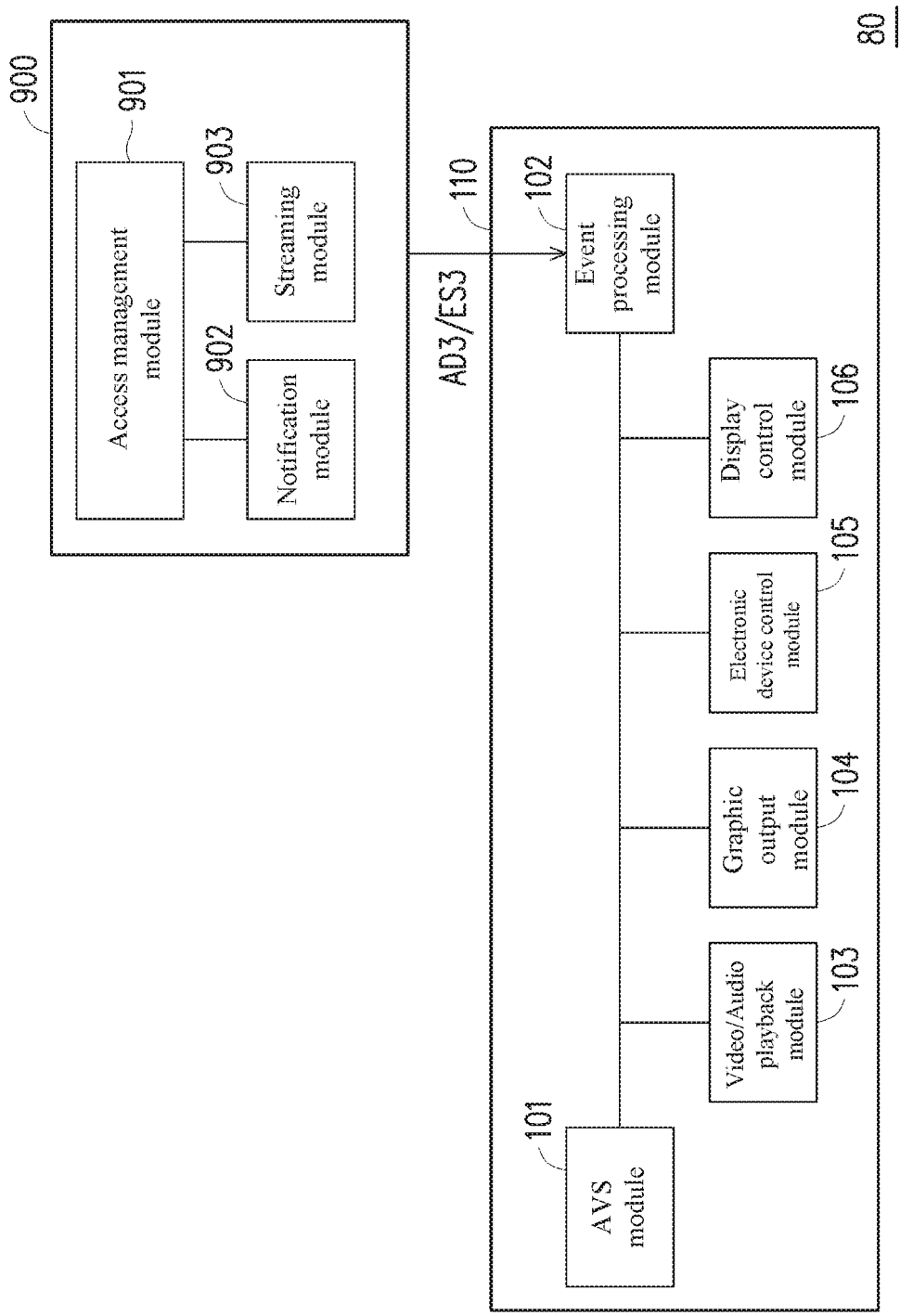
FIG. 8 is a schematic diagram showing a multimedia system according to another embodiment of the invention.

FIG. 8 is a schematic diagram showing a multimedia system according to another embodiment of the invention.

Referring to FIG. 1 and FIG. 8, a multimedia system 80 may include a multimedia apparatus 100 and an access management device 900. In the present embodiment, the access management device 900 may be, for example, an electronic device having access management functions or a mobile device, a tablet, a portable personal computer, or an electronic device having video/audio functions that is connected with an access management system. The invention is not limited therein. The multimedia apparatus 100 can establish a connection with the access management device 900 via the wireless transmission device 150, and establish a further connection with the access management system via the application of the access management device 900. Or, in one embodiment, the multimedia apparatus 100 can also establish a connection with the electronic device having access management functions via the wireless transmission device 150 directly. The invention is not limited therein. In the present embodiment, the access management device 900 includes an access management module 901, a notification module 902 and a streaming module 903.

In the present embodiment, when a visitor operates the access management device 900 (such as ringing a doorbell), the notification module 902 is for providing a third event-processing signal ES3 to the processing device 110, so that the event processing module 102 of the processing device 110 can drive at least one of the video/audio playback module 103 or the graphic output module 104 correspondingly. The event processing module 102 receives a third image data AD3 provided by the streaming module 903 of the access management device 900 via the wireless transmission device 150, and drives the video/audio playback module 103 to operate the projection device 130 to project a third projection picture according to the third image data AD3. The third image data AD3 may be the image of the visitor outside the door.

In other words, the multimedia system 80 of the present embodiment can provide access management functions. The access management module 901 of the access management device 900 receives the image data outside the door, and drives the notification module 902 and the streaming module 903 to generate the third event-processing signal ES3 and the third image data AD3. In the present embodiment, the third image data AD3 may be, for example, MPEG-4 image data having a resolution of 480p.

Moreover, the details of the devices and the modules of the multimedia apparatus and the external server of the present embodiment can be found according to the teachings and explanations described in the previous embodiments shown in FIG. 1 and FIG. 3, which are omitted here for concise purpose.

To sum up, the multimedia apparatus and the multimedia system of the invention may have voice recognition and projection functions. After the user provided voice data, the multimedia apparatus can execute corresponding multimedia operations and generate corresponding voice data and projection image as a feedback. Moreover, the multimedia apparatus of the invention can display the emoticon graphic by the display module as a response to the recognition result of the voice data to provide a personification responding effect. Furthermore, the multimedia apparatus of the invention can further be wirelessly coupled with an external electronic device, such as a lighting device or an access management system, so that the user can remotely control the lighting device via voice data, or view the image outside the door provided by the access management system via the projection device. Therefore, the multimedia apparatus and the multimedia system of the invention have interactive and diversified multimedia operation functions to provide good user experience.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multimedia apparatus, comprising:
a wireless transmission device;
an audio receiving device for receiving a first voice data;
a processing device coupled with the audio receiving device and the wireless transmission device, the processing device being for outputting the first voice data via the wireless transmission device, wherein the processing device is coupled with a voice recognition device via the wireless transmission device, the voice recognition device is suitable of recognizing the first voice data to obtain a recognition result;
a projection device coupled with the processing device, when the processing device receiving a first image data corresponding to the first voice data via the wireless transmission device, the processing device operating the projection device to project a first projection picture according to the first image data; and
a storage device coupled with the processing device for storing a second image data,
wherein the recognition result of the first voice data is related to the second image data, the voice recognition device outputs a second instruction signal to an external server according to the recognition result, whereby the processing device receives, via the wireless transmission device, a first event-processing signal outputted by the external server corresponding to the second instruction signal,
wherein the processing device retrieves the second image data from the storage device based on the first event-processing signal and operates the projection device to project a second projection picture according to the second image data.

2. The multimedia apparatus according to claim 1, further comprising:
an audio playback device coupled with the processing device,
wherein when the processing device receives a second voice data responding to the recognition result of the first voice data via the wireless transmission device, the processing device operates the audio playback device to play the second voice data.

3. The multimedia apparatus according to claim 2, further comprising:
a display module coupled with the processing device, the processing device further comprising a display control module, the display module being for displaying an image picture according to an image signal provided by the display control module, wherein the image signal is determined responding to the second voice data.

4. The multimedia apparatus according to claim 3, wherein the display module comprises a first display and a second display, and the image signal comprises a first sub-image signal and a second sub-image signal, wherein the first display displays a first sub-image picture according to the first sub-image signal, and the second display displays a second sub-image picture according to the second sub-image signal,
wherein the first sub-image picture and the second sub-image picture are suitable of being combined into an emoticon graphic.

5. The multimedia apparatus according to claim 4, wherein the first display and the second display are passive matrix organic light emitting diode displays.

6. The multimedia apparatus according to claim 4, wherein the processing device is coupled with the first display and the second display via two connection ports conforming to the Serial Peripheral Interface protocol, respectively.

7. The multimedia apparatus according to claim 1, wherein the processing device is coupled with the projection device via a connection port conforming to the Mobile Industry Processor Interface—Display Serial Interface protocol.

8. The multimedia apparatus according to claim 1, wherein the voice recognition device outputs a first instruction signal to an external server according to the recognition result of the first voice data, the external server retrieves target data according to the first instruction signal from the Internet, and the external server arranges the target data in a default data arrangement format to generate the first image data and output to the processing device, the processing device receives the first image data of the external server via the wireless transmission device.

9. The multimedia apparatus according to claim 1, further comprising:
an electronic device coupled with the processing device via the wireless transmission device, wherein the processing device further comprises an electronic device control module, the electronic device control module outputs a control signal to the electronic device according to the recognition result of the first voice data.

10. The multimedia apparatus according to claim 9, wherein the electronic device is a lighting device, and the voice recognition device outputs a third instruction signal to an external server according to the recognition result of the first voice data, whereby the processing device receives via the wireless transmission device a second event-processing signal output by the external server corresponding to the third instruction signal,
wherein the electronic device control module of the processing device generates the control signal according to the second event-processing signal, whereby the electronic device control module operates the lighting device via the control signal.

11. The multimedia apparatus according to claim 1, further comprising:
an access management device coupled with the processing device via the wireless transmission device, the processing device further comprising an event processing module, and when the event processing module receiving via the wireless transmission device a third image data provided by the access management device, the event processing module of the processing device operating the projection device to project a third projection picture according to the third image data.

12. A multimedia system, comprising:
a cloud system having a voice recognition device and an external server; and
a multimedia apparatus, comprising:
a wireless transmission device coupled with the cloud system;

an audio receiving device for receiving a first voice data;

a processing device coupled with the audio receiving device and the wireless transmission device, the processing device being for outputting the first voice data via the wireless transmission device to the cloud system, the voice recognition device recognizing the first voice data to obtain a recognition result, and the external server outputting a first image data according to the recognition result of the first voice data to the processing device, wherein the processing device is coupled with the voice recognition device via the wireless transmission device;

a projection device coupled with the processing device, when the processing device receiving the first image data corresponding to the first voice data via the wireless transmission device, the processing device operating the projection device to project a first projection picture according to the first image data; and a storage device coupled with the processing device for storing a second image data, wherein the recognition result of the first voice data is related to the second image data, the voice recognition device outputs a second instruction signal to an external server according to the recognition result, whereby the processing device receives, via the wireless transmission device, a first event-processing signal outputted by the external server corresponding to the second instruction signal, wherein the processing device retrieves the second image data from the storage device based on the first event-processing signal and operates the projection device to project a second projection picture according to the second image data.

13. The multimedia system according to claim 12, wherein the multimedia apparatus further comprises:

an audio playback device coupled with the processing device, wherein the voice recognition device obtains a second voice data according to the recognition result of the first voice data, wherein when the processing device receives the second voice data via the wireless transmission device, the processing device operates the audio playback device to play the second voice data.

14. The multimedia system according to claim 13, wherein the multimedia apparatus further comprises:

a display module coupled with the processing device, the processing device further comprising a display control module, the display module being for displaying an image picture according to an image signal provided by the display control module, wherein the image signal is determined responding to the second voice data.

15. The multimedia system according to claim 14, wherein the display module comprises a first display and a second display, and the image signal comprises a first sub-image signal and a second sub-image signal, wherein the first display displays a first sub-image picture according to the first sub-image signal, and the second display displays a second sub-image picture according to the second sub-image signal, wherein the first sub-image picture and the second sub-image picture are suitable of being combined into an emoticon graphic.

16. The multimedia system according to claim 15, wherein the first display and the second display are passive matrix organic light emitting diode displays.

17. The multimedia system according to claim 15, wherein the processing device is coupled with the first display and the second display via two connection ports conforming to the Serial Peripheral Interface protocol, respectively.

18. The multimedia system according to claim 12, wherein the processing device is coupled with the projection device via a connection port conforming to the Mobile Industry Processor Interface—Display Serial Interface protocol.

19. The multimedia system according to claim 12, wherein the voice recognition device outputs a first instruction signal according to the recognition result of the first voice data to the external server, the external server retrieves target data according to the first instruction signal from the Internet, and the external server arranges the target data in a default data arrangement format to generate the first image data and output to the processing device, the processing device receives the first image data of the external server via the wireless transmission device.

20. The multimedia system according to claim 12, further comprising:

an electronic device coupled with the processing device via the wireless transmission device, wherein the processing device further comprises an electronic device control module, the electronic device control module outputs a control signal to the electronic device according to the recognition result of the first voice data.

21. The multimedia system according to claim 20, wherein the electronic device is a lighting device, and the voice recognition device outputs a third instruction signal to an external server according to the recognition result of the first voice data, whereby the processing device receives via the wireless transmission device a second event-processing signal output by the external server corresponding to the third instruction signal, wherein the electronic device control module of the processing device generates the control signal according to the second event-processing signal, whereby the electronic device control module operates the lighting device via the control signal.

22. The multimedia system according to claim 12, further comprising: an access management device coupled with the processing device via the wireless transmission device, the processing device further comprising an event processing module, and when the event processing module receiving via the wireless transmission device a third image data provided by the access management device, the event processing module of the processing device operating the projection device to project a third projection picture according to the third image data.

* * * * *